(12) United States Patent
White et al.

(10) Patent No.: US 10,514,064 B2
(45) Date of Patent: Dec. 24, 2019

(54) BEARING PACKAGE AND INSTALLATION TOOL

(71) Applicant: The Timken Company, North Canton, OH (US)

(72) Inventors: Brian White, North Canton, OH (US); Jean-Pierre Haeffele, Hattstatt (FR); Russell Folger, Canton, OH (US)

(73) Assignee: The Timken Company, North Canton, OH (US)

( * ) Notice: Subject to any disclaimer, the term of this patent is extended or adjusted under 35 U.S.C. 154(b) by 202 days.

(21) Appl. No.: 15/321,832

(22) PCT Filed: May 17, 2016

(86) PCT No.: PCT/US2016/032829
§ 371 (c)(1),
(2) Date: Dec. 23, 2016

(87) PCT Pub. No.: WO2016/191144
PCT Pub. Date: Dec. 1, 2016

(65) Prior Publication Data
US 2017/0146069 A1    May 25, 2017

Related U.S. Application Data

(60) Provisional application No. 62/165,291, filed on May 22, 2015.

(51) Int. Cl.
*F16C 35/067* (2006.01)
*F16C 43/04* (2006.01)
(Continued)

(52) U.S. Cl.
CPC ............ *F16C 35/067* (2013.01); *B25B 27/00* (2013.01); *B25B 27/06* (2013.01); *F16C 19/543* (2013.01);
(Continued)

(58) Field of Classification Search
CPC .. F16C 19/364; F16C 19/543; F16C 2326/02; F16C 35/067; F16C 41/04; F16C 43/04;
(Continued)

(56) References Cited

U.S. PATENT DOCUMENTS 306,510 A * 10/1884 Murray ............... B60B 27/0005
                                                  384/544
628,138 A *  7/1899 Busse ................. B60B 27/0005
                                                  384/544
(Continued)

FOREIGN PATENT DOCUMENTS

| DE | 102012206659 | 10/2013 |
| EP | 2400172 | 12/2011 |
| JP | 2008169957 | 7/2008 |

OTHER PUBLICATIONS

International Search Report and Written Opinion for Application No. PCT/US2016/032829 dated Aug. 29, 2016.

*Primary Examiner* — Joseph J Hail
*Assistant Examiner* — Arman Milanian
(74) *Attorney, Agent, or Firm* — Michael Best & Friedrich LLP

(57) ABSTRACT

A device for supporting and installing a bearing assembly includes an inner ring having an inner ring axial face, an outer ring having an outer ring axial face and an outer diameter, and a plurality of rolling elements positioned between the inner ring and the outer ring. The device comprises a sleeve having an inner diameter sized and configured to receive and support the outer ring along the outer diameter, and a disc positioned within the sleeve. The disc includes a disc outer diameter sized and configured to permit sliding of the disc along the sleeve inner diameter in an axial direction of the sleeve, and a disc face surface sized
(Continued)

and configured to engage the inner ring axial face, or the outer ring axial face, or both when the bearing assembly is received in the sleeve.

18 Claims, 8 Drawing Sheets

(51) Int. Cl.
  *B25B 27/06* (2006.01)
  *B25B 27/00* (2006.01)
  *F16C 41/04* (2006.01)
  *F16C 19/54* (2006.01)
  *F16C 19/36* (2006.01)

(52) U.S. Cl.
  CPC .............. *F16C 41/04* (2013.01); *F16C 43/04* (2013.01); *F16C 19/364* (2013.01); *F16C 2326/02* (2013.01)

(58) Field of Classification Search
  CPC ........... Y10T 29/49696; Y10T 29/5393; B25B 27/00; B25B 27/0028; B25B 27/06
  USPC ................... 384/544, 559, 584, 589; 29/724, 29/898.061, 898.07, 898.09
  See application file for complete search history.

(56) References Cited

U.S. PATENT DOCUMENTS

| | | | | |
|---|---|---|---|---|
| 2,441,981 A * | 5/1948 | Stelzer | .................... | B25B 27/00 29/275 |
| 2,852,838 A * | 9/1958 | Krutmeijer | ........... | B25B 27/064 29/252 |
| 2,945,730 A | 7/1960 | Murray et al. | | |
| 3,084,791 A | 4/1963 | Hawley | | |
| 3,165,949 A * | 1/1965 | Thill | .................... | B25B 27/0028 81/8.1 |
| 3,783,485 A * | 1/1974 | Nastasi | .................... | B25B 27/06 29/280 |
| 3,844,010 A * | 10/1974 | Frost | ....................... | F16C 33/80 228/110.1 |
| 4,509,241 A * | 4/1985 | Freeland | ............... | B25B 27/062 29/263 |
| 5,165,169 A * | 11/1992 | Boyce | .................... | B25B 27/062 29/263 |
| 5,195,830 A * | 3/1993 | Caillault | ............. | F16C 33/7879 384/448 |
| 5,442,854 A * | 8/1995 | Koltookian | ............. | B23P 19/02 29/244 |
| 5,573,311 A * | 11/1996 | Clohessy | ................. | F16B 39/32 301/105.1 |
| 5,911,459 A * | 6/1999 | Hofmann | ............... | F16C 35/067 29/525 |
| 6,062,737 A * | 5/2000 | Thienes | .................. | B60B 27/00 384/562 |
| 6,170,832 B1 * | 1/2001 | Ernst | ...................... | F16J 15/447 277/412 |
| 6,234,293 B1 * | 5/2001 | Fasoli | .................... | B65G 39/09 193/37 |
| 6,257,078 B1 * | 7/2001 | Vencill | .................... | F16C 25/06 33/517 |
| 6,544,140 B2 * | 4/2003 | Gradu | ................... | F16C 19/547 384/585 |
| 6,581,288 B1 * | 6/2003 | Rybkoski | ................ | B60B 27/00 29/898.062 |
| 7,478,464 B2 * | 1/2009 | Kang | ...................... | B25B 27/06 29/255 |
| 8,356,946 B2 * | 1/2013 | Schaefer | ................ | B60B 27/001 384/589 |
| 8,905,644 B2 * | 12/2014 | Esenwein | ............. | B24B 23/028 384/537 |
| 2004/0177509 A1 * | 9/2004 | Russell | .................. | F16C 19/364 29/898.062 |
| 2009/0208159 A1 * | 8/2009 | Heim | ...................... | B60B 27/001 384/448 |
| 2013/0205604 A1 | 8/2013 | Esenwein et al. | | |
| 2014/0126976 A1 * | 5/2014 | Schmid | .................. | F16B 39/32 411/114 |
| 2015/0285224 A1 * | 10/2015 | Hambrecht | ........... | F16C 19/522 415/1 |

\* cited by examiner

US 10,514,064 B2

BEARING PACKAGE AND INSTALLATION TOOL

RELATED APPLICATIONS

This application claims the benefit of U.S. Provisional Patent Application No. 62/165,291 filed May 22, 2015, the entire content of which is hereby incorporated by reference herein.

BACKGROUND

The present invention relates to bearings, and more specifically to a device and method for packaging and installing a bearing.

Transporting and installing bearings is sometimes complicated with bearings that are not unitized or held together by their own components. Specifically, some bearings include an inner ring, an outer ring, and a plurality of rolling elements between the inner and outer rings. Where the bearing assembly is not otherwise unitized, or held together, the outer ring can move relative to the inner ring and roller assembly, resulting in potential seal and/or inner ring and cage damage.

SUMMARY

The present invention provides a device for packaging (i.e., retaining and transporting) and installing a bearing assembly that may not be unitized.

In one embodiment, the invention provides a device for supporting and installing a bearing assembly. The bearing assembly includes an inner ring having an inner ring axial face, an outer ring having an outer ring axial face and an outer diameter, and a plurality of rolling elements positioned between the inner ring and the outer ring. The device comprises a sleeve having an inner diameter sized and configured to receive and support the outer ring along the outer diameter, and a disc positioned within the sleeve. The disc includes a disc outer diameter sized and configured to permit sliding of the disc along the sleeve inner diameter in an axial direction of the sleeve, and a disc face surface sized and configured to engage the inner ring axial face, or the outer ring axial face, or both when the bearing assembly is received in the sleeve.

In another embodiment the invention provides a device for supporting and installing a bearing assembly. The bearing assembly includes an inner ring having an inner ring, axial face, an outer ring having an outer ring axial face and an outer diameter, and a plurality of rolling elements positioned between the inner ring and the outer ring. The device comprises a sleeve having an inner diameter sized and configured to receive and support the outer ring along the outer diameter, the sleeve including a plurality of spaced-apart ridges extending axially along the sleeve, the ridges collectively defining an inner diameter of the sleeve that engages the outer diameter of the outer ring. The device further includes a disc positioned within the sleeve. The disc includes a disc outer diameter sized and configured to permit sliding of the disc along the sleeve inner diameter in an axial direction of the sleeve, and a disc face surface sized and configured to engage the inner ring axial face, or the outer ring axial face, or both when the bearing assembly is received in the sleeve. The disc and the sleeve are initially molded from plastic as one piece, and a shear feature is molded between the disc and the sleeve to facilitate separation of the disc from the sleeve upon application of a force to the disc.

In yet another embodiment the invention provides a method of installing a bearing assembly into a housing using a device for supporting and installing the bearing assembly. The device has a sleeve with an inner diameter sized and configured to receive and support the bearing assembly, and a disc positioned within the sleeve. The disc includes a disc outer diameter sized and configured to permit sliding of the disc along the sleeve inner diameter in an axial direction of the sleeve, and a disc face surface sized and configured to engage the bearing assembly when the bearing assembly is received in the sleeve. The method includes aligning the sleeve of the device with the housing into which the bearing assembly is to be installed, applying an axial force to the disc in a direction toward the housing, the axial force causing the disc and the bearing assembly to slide within the sleeve toward the housing, and to exit the sleeve and enter the housing, and removing the disc from within the housing, leaving the bearing assembly installed in the housing.

Other aspects of the invention will become apparent by consideration of the detailed description and accompanying drawings.

DETAILED DESCRIPTION

Figure 1:
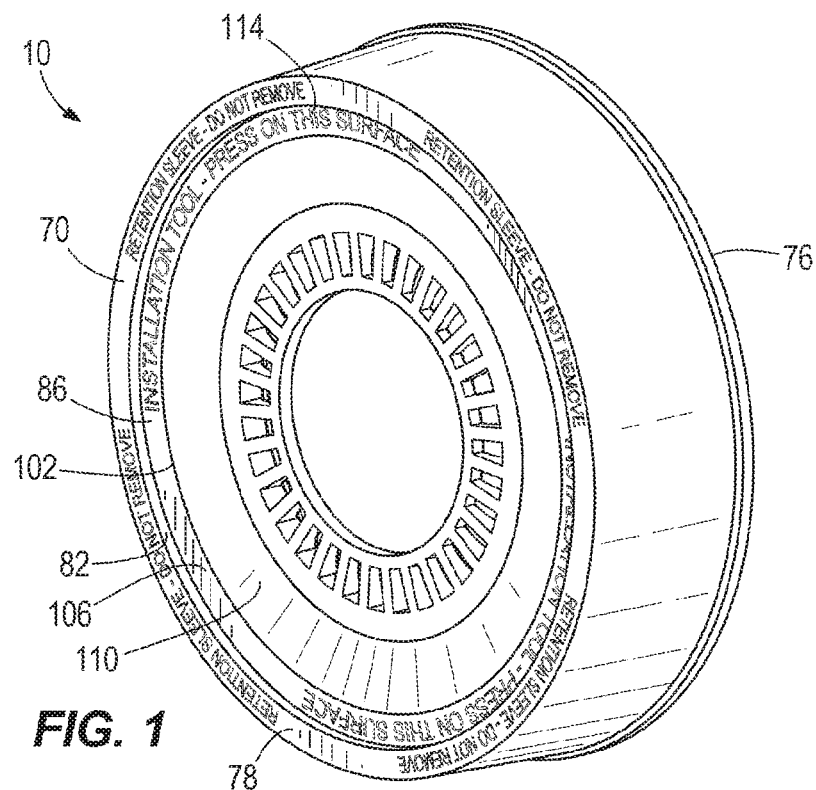
FIG. 1 is a rear perspective view of a device for supporting and installing a bearing assembly.
Figure 2:
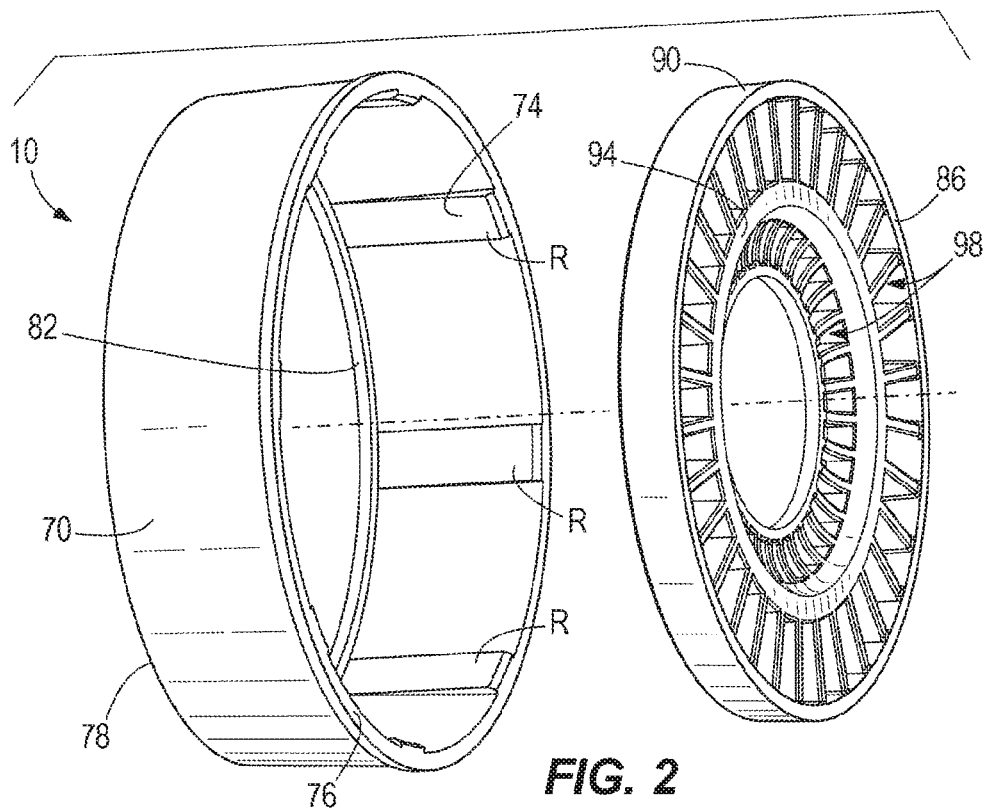
FIG. 2 is an exploded view of the device of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-7 illustrate a device 10 for supporting and installing a bearing assembly 14. The device can be used to package and transport the bearing assembly 14, and can further be used to install the bearing assembly 14 into a housing 18 (e.g., a wheel hub—see FIGS. 5-7).

As seen in FIGS. 3-7, the illustrated bearing assembly 14 is a non-unitized rolling element bearing as is known to those skilled in the art. The bearing assembly 14 includes an inner ring 22 having an inner ring, axially-facing axial face 26 and a raceway 30. The bearing assembly 14 further includes an outer ring 34 having an outer ring, axially-facing axial face 38, which in the illustrated embodiment, is defined on an extension 42 of the outer ring 34. The outer ring 34 further includes an outer surface 46 defining an outer diameter of the outer ring 34, and a raceway 50. A plurality of rolling elements 54 (e.g., rollers) are positioned between the inner and outer rings 22, 34 on the respective raceways 30, 50. In the illustrated embodiment, a cage 58 is provided to maintain the relative spacing between the rolling elements 54. A seal or seal assembly 62 is also positioned between the extension 42 of the outer ring 34 and a rib 66 of the inner ring 22. The illustrated bearing assembly 14 is non-unitized, meaning that the bearing assembly 14 is not held together and the outer ring 34 can move relative to the inner ring 22 and roller assembly, resulting in potential seal and/or inner ring and/or cage damage.

The device 10 includes a sleeve 70 having an inner diameter 74 sized and configured to receive and support the outer ring 34 along the outer diameter of the outer surface 46. The illustrated sleeve 70 is generally cylindrical (shown with a slight taper along its outer surface) and tubular to conform in shape to the cylindrical outer surface 46 of the outer ring 34. In the illustrated embodiment, the sleeve 70 includes a plurality of spaced-apart ridges R (see FIG. 2) that extend axially along at least a portion of the sleeve 70 and that collectively define the inner diameter 74 of the sleeve 70 such that radially inner-most surfaces of the ridges R engage and support the outer ring 34 along its outer surface 46. While eight evenly-spaced ridges R are illustrated, in other embodiments, the number and spacing of the ridges R can vary. Additionally, the geometry of the ridges R may take other forms, such as semi-circular or other cross-sectional geometries. The ridges R also operate to relieve stress (e.g., hoop stress) in the sleeve 70 when the bearing assembly 14 is received therein. The inner-most surfaces of the ridges R are dimensioned to provide a tight fit around the outer ring 34 when the outer ring 34 is positioned within the sleeve 70 while also ensuring that contact with the outer surface 46 of the outer ring 34 is circumferentially intermittent instead of continuous around the entire circumference. In addition to relieving stress in the sleeve 70 as mentioned above, this can also facilitate the ability of the bearing assembly 14 to slide within the sleeve 70. In other embodiments, the inner surface of the sleeve 70 need not have ridges or other features defining the inner diameter 74, but instead could be cylindrical to provide a tight fit around the entirety of the outer surface 46.

The axial length of the sleeve 70 can be shorter than the axial length of the outer ring 34, as shown, or if desired, can be the same as or longer than the axial length of the outer ring 34. The sleeve has a first end 76 open to receive the bearing assembly 14 therein. The sleeve further includes a second end 78 having a shoulder 82 that extends radially inwardly from the inner diameter 74 such that an opening defined at the second end 78 is smaller than the opening defined at the first end 76. The sleeve 70 can be made of molded plastic or other suitable materials. The wall thickness of the sleeve 70 can vary as desired according to packaging requirements.

The device further includes a disc 86 positioned within the sleeve 70. The disc can also be made of molded plastic or other suitable materials, and in the illustrated embodiment is a separate piece from the sleeve 70. The disc 86 has a radially outer surface 90 defining a disc outer diameter sized and configured to permit sliding of the disc 86 along the sleeve inner diameter 74 in an axial direction of the sleeve 70. A tight fit can be used as long as relative sliding can take place. In the illustrated embodiment, the outer surface 90 has a diameter slightly smaller than the inner diameter 74 as defined by the ridges R. In other embodiments, the outer surface 90 could include cut-outs or notches corresponding in shape to the cross-section of the ridges R such that the disc 86 would slide within the sleeve 70 as guided and anti-rotated by the interaction between the ridges R and the corresponding cut-outs.

The illustrated disc 86 further defines a disc face surface 94 sized and configured to engage at least one of the inner ring axial face 26 and the outer ring axial face 38 when the bearing assembly 14 is received and supported in the sleeve 70. The disc face surface 94 includes recesses 98 where material (e.g., plastic) has been removed to reduce the amount of material needed for the disc 86, while still providing areas of thickened material for strength and rigidity. The disc 86 further includes a disc pressing surface 102 opposite the disc face surface 94. The disc pressing surface 102 has a planar portion 106 configured to receive a pressing tool (e.g., a tubular member such as a pipe or other metal tubing), and a non-planar portion 110 radially inward of the planar portion 106. The planar portion 106 is at or adjacent the outer-most radius of the disc 86 to encourage application of the pressing force F (discussed further below) at this location. Text or other indicia 114 can be provided on the planar portion 106 as explicit instructions to the user to apply the pressing force at the planar portion 106. The illustrated non-planar portion 110 tapers toward the disc face surface 94 to create a concavity radially inward of the planar portion 106. This concavity discourages and/or prevents application of the pressing force in this location. However, in other embodiments, the entire disc pressing surface 102 could be planar.

Figure 4:
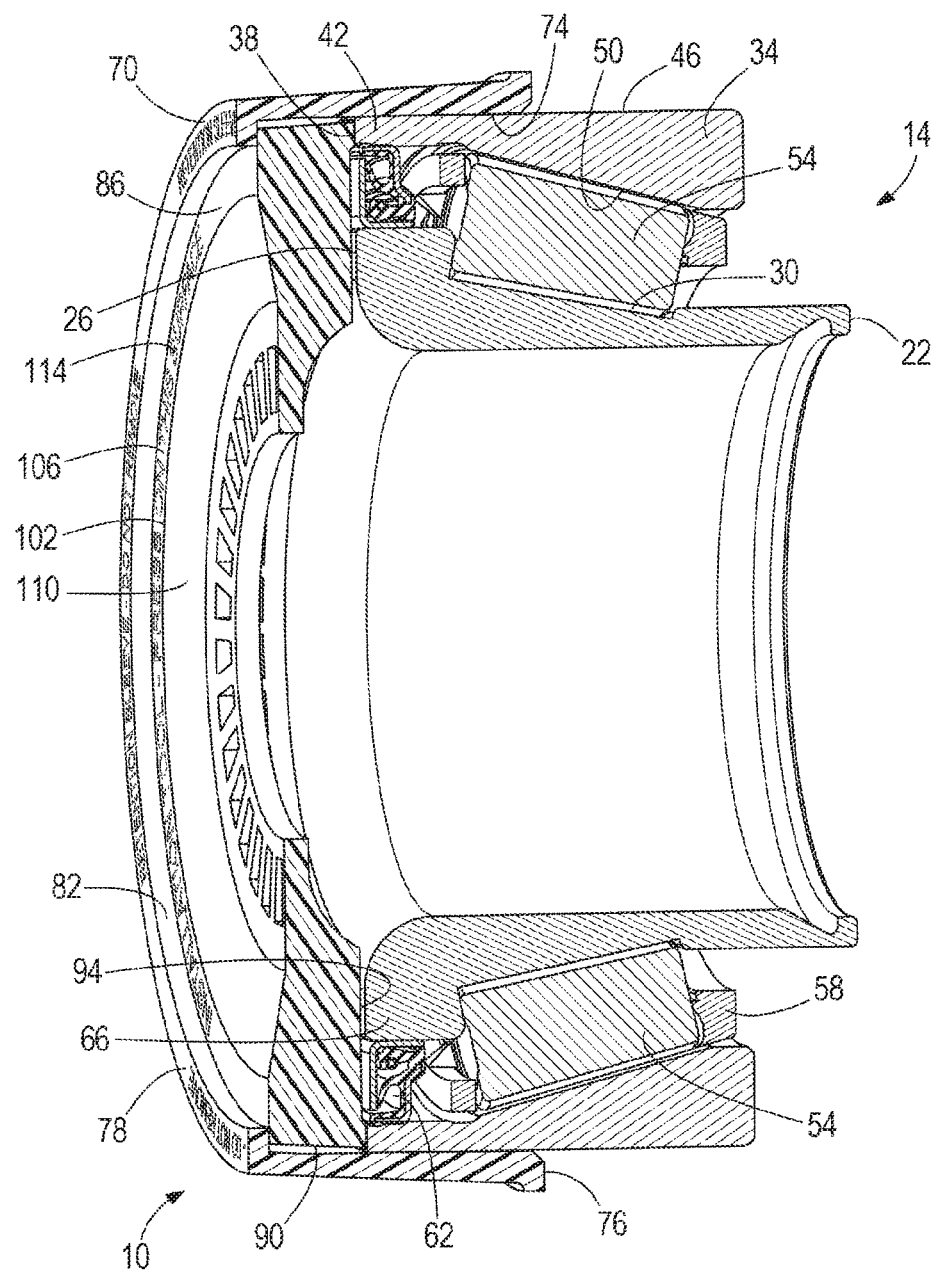
FIG. 4 is a section view taken along line 4-4 of FIG. 3.

The illustrated disc 86 is annular in shape. In other embodiments, the disc 86 need not be annular. Furthermore, the disc 86 could engage both the inner ring axial face 26 and the outer ring axial face 38, instead of only the outer ring axial face 38 as shown. As shown in FIGS. 1 and 4, the disc 86 abuts the shoulder 82 adjacent the second end 78 of the sleeve 70 so that the shoulder 82 limits axial movement of the disc 86 in a direction toward the second end 78, but allows axial movement of the disc 86 within the sleeve 70 toward the first end 76.

Figure 3:
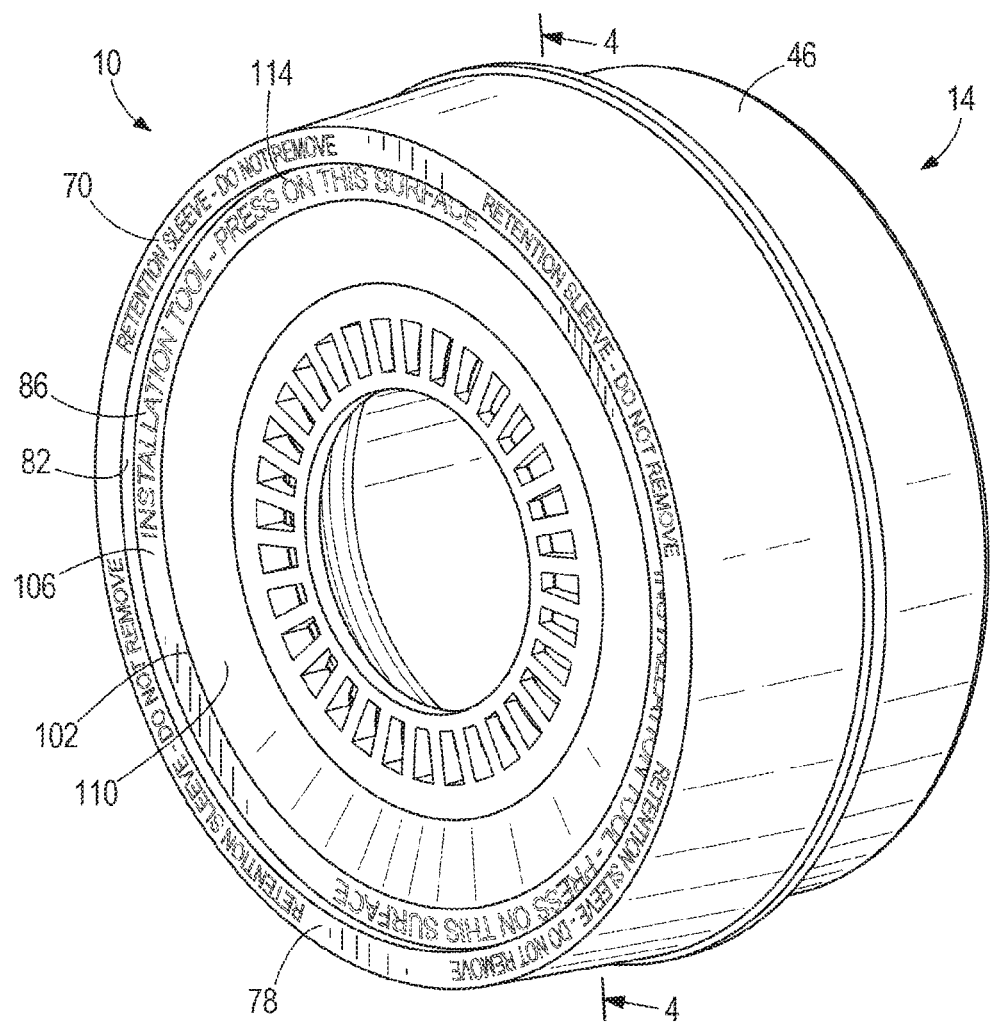
FIG. 3 illustrates the device of FIG. 1, shown with a bearing assembly supported therein.

As shown in FIGS. 3 and 4, the hearing assembly 14 can be received and supported within the device 10 for storage, transportation, and handling. When the bearing assembly 14 is housed in the device 10, the sleeve 70 snugly envelopes the outer ring 34, and the disc 86 engages or abuts the outer ring axial face 38, and perhaps even the seal 62. As mentioned above, in other embodiments, the disc 86 may also engage the inner ring axial face 26. Together, the sleeve 70 and the disc 86 cooperate to unitize the bearing assembly 14 and prevent damage caused by relative movement of the bearing assembly components.

Figure 5:
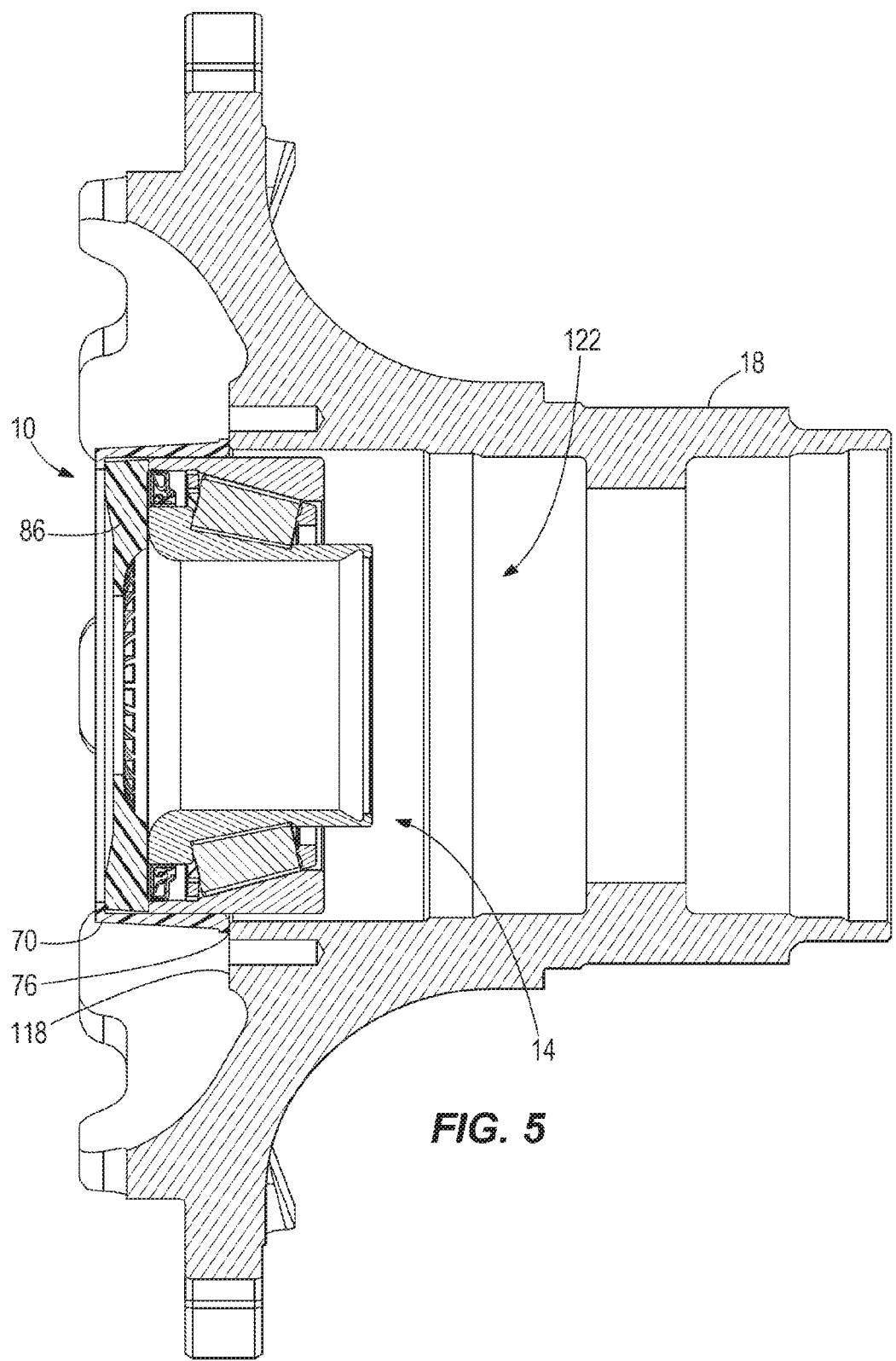
FIGS. 5-7 illustrate a method of installing a bearing assembly initially retained within the device of FIG. 1 into a housing.
Figure 6:
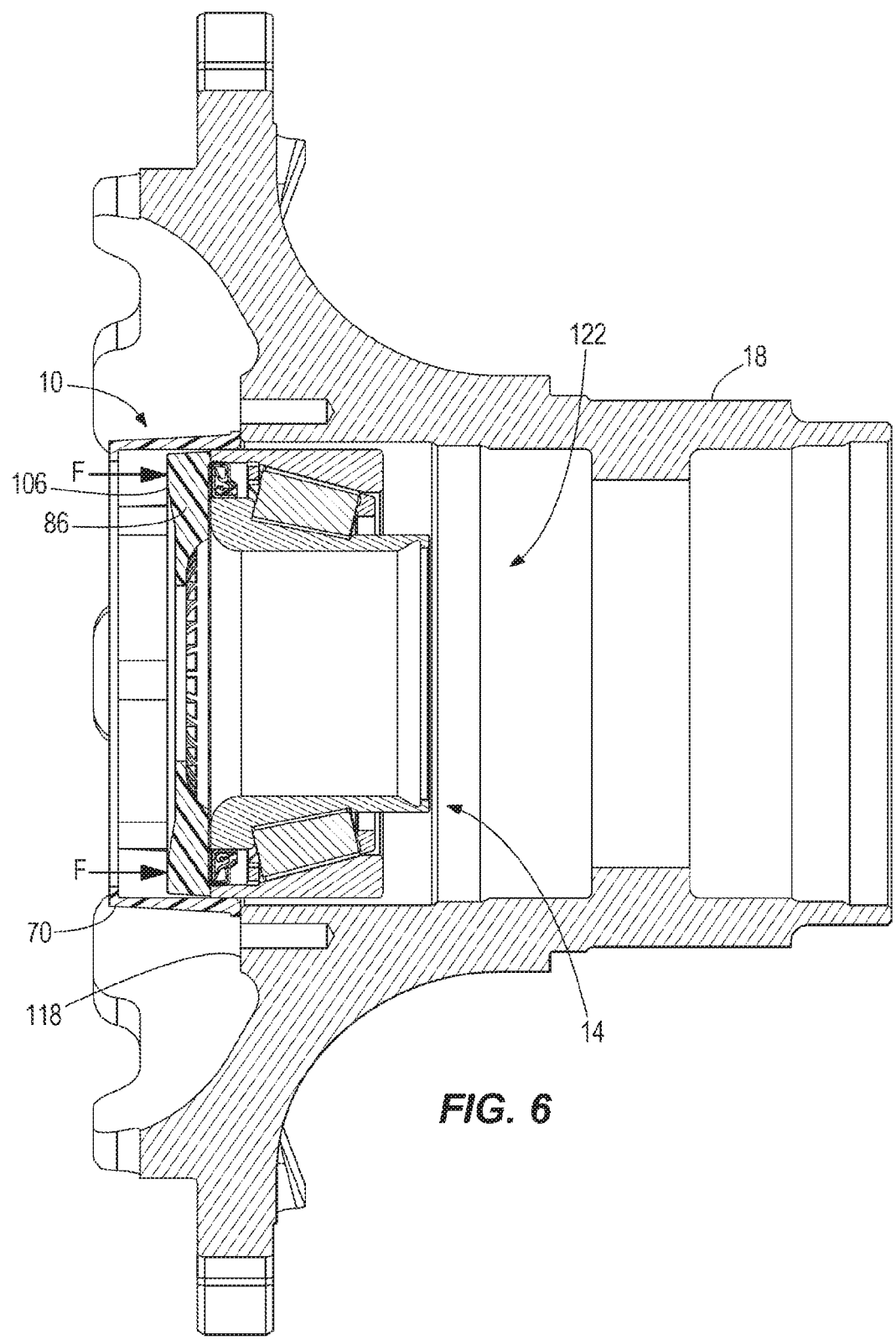
Figure 7:
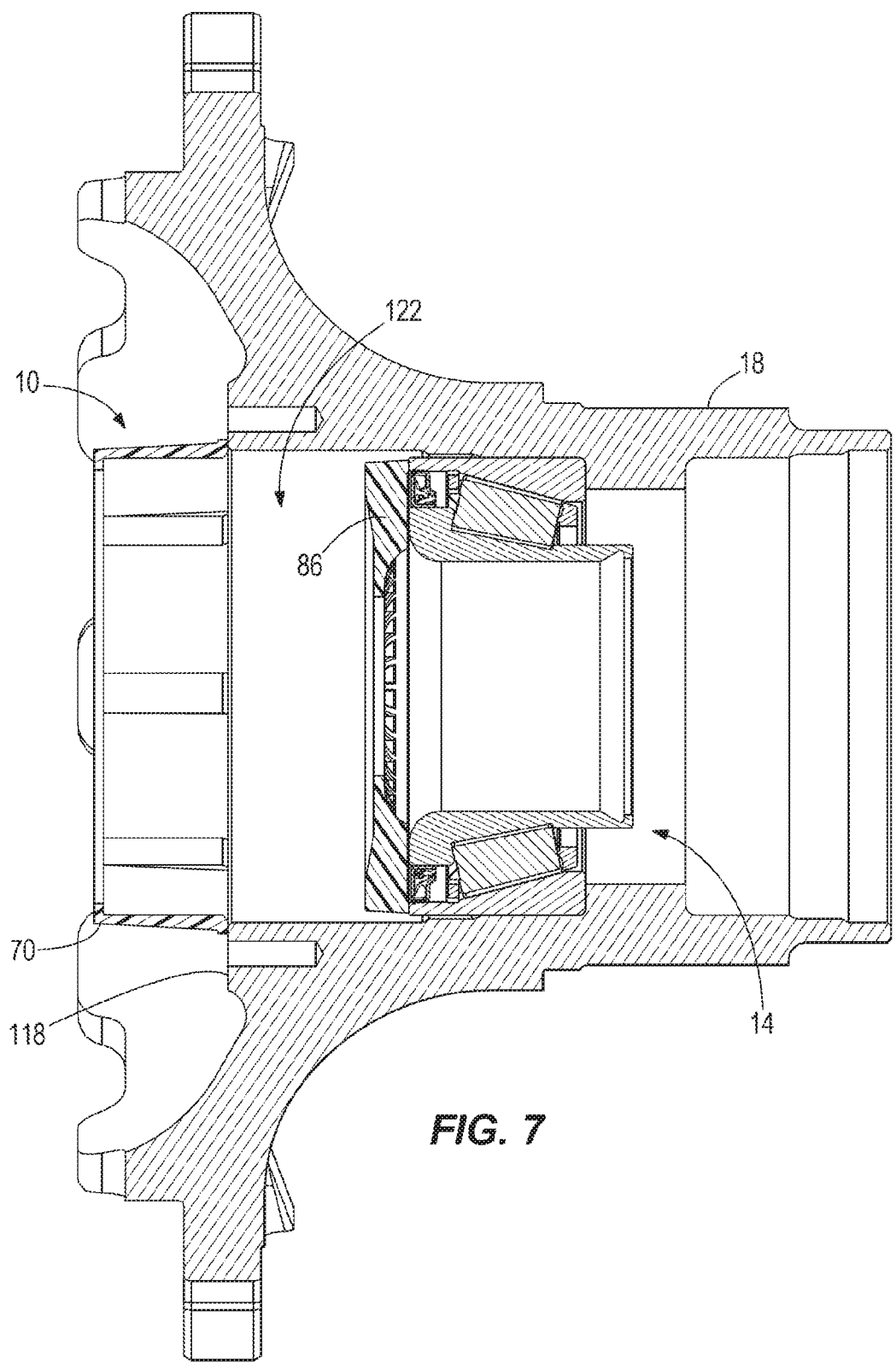

The device 10 can also operate as an installation tool for installing the bearing assembly 14 into a housing 18 from within the device 10. FIGS. 5-7 illustrate the use of the device 10 as an installation tool. The illustrated housing 18 is a wheel hub into which the bearing assembly is installed. Of course, the device can be used to package and install other bearing assemblies into other types of housings as well. As seen in FIG. 5, the first end 76 of the sleeve 70 is aligned with an axial face 118 of the housing 18, adjacent to a bore or cavity 122 into which the bearing assembly 14 is to be installed. Because the illustrated sleeve 70 has a shorter axial length than the outer ring 34 (and the entire bearing assembly 14), the placement of the first end 76 of the sleeve 70 against the axial face 118 pilots the bearing assembly 14 partially into the cavity 122. Next, as shown in FIG. 6, an axial force F is applied to the disc 86 in a direction toward the housing 18. As discussed above, the axial force F is preferably provided at the planar portion 106, and can be applied using a pipe, tube or other suitable device. Due to the engagement between the disc face surface 94 and the outer ring axial face 38, the axial force F causes both the disc 86 and the bearing assembly 14 to slide within the sleeve 70 toward the housing 18, and eventually to exit the sleeve 70 and further enter or move into the cavity 122 in the housing 18. The axial force F is continued to be applied to the disc 86 until the bearing assembly 14 reaches its final, installed position within the cavity 122, as shown in FIG. 7. The disc 86 is then removed from the cavity 122 in the housing 18, leaving the bearing assembly 14 installed in the housing 18. The removed disc 86, along with the sleeve 70, can be re-used, recycled, or discarded.

Figure 8:
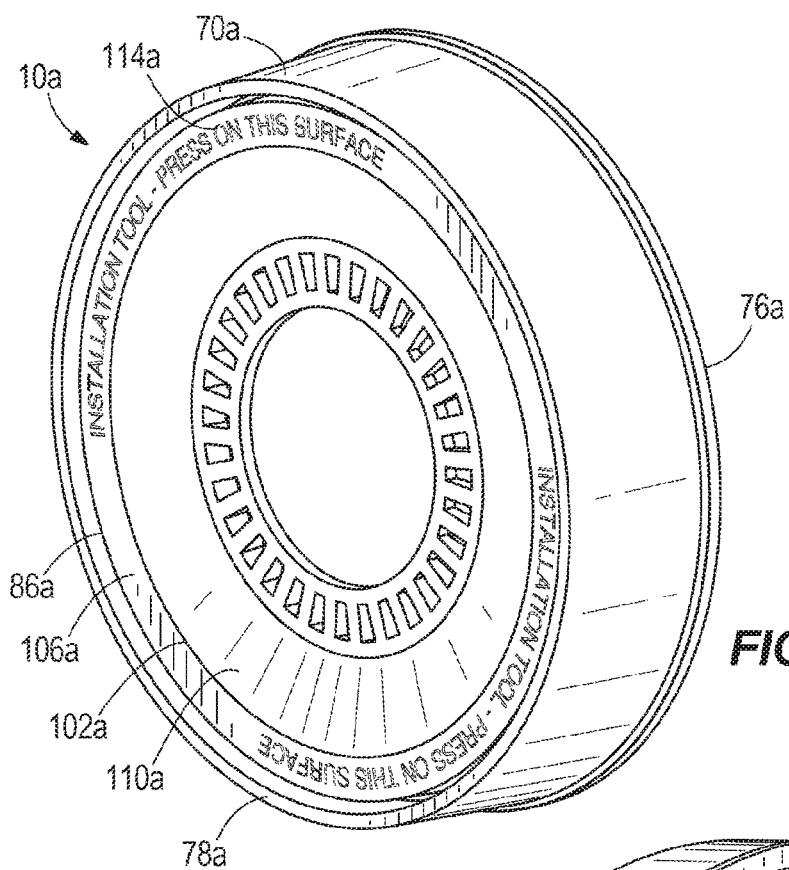
FIG. 8 is a rear perspective view of another embodiment of a device for supporting and installing a bearing assembly.
Figure 9:
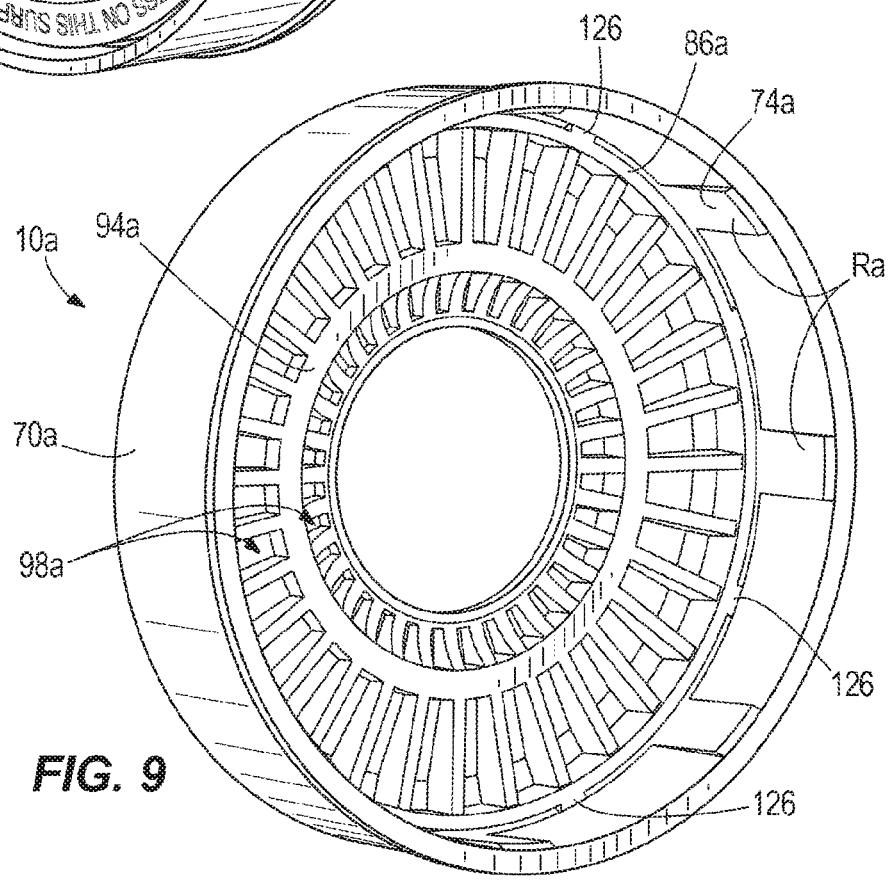
FIG. 9 is a front perspective view of the device of FIG. 8.
Figure 10:
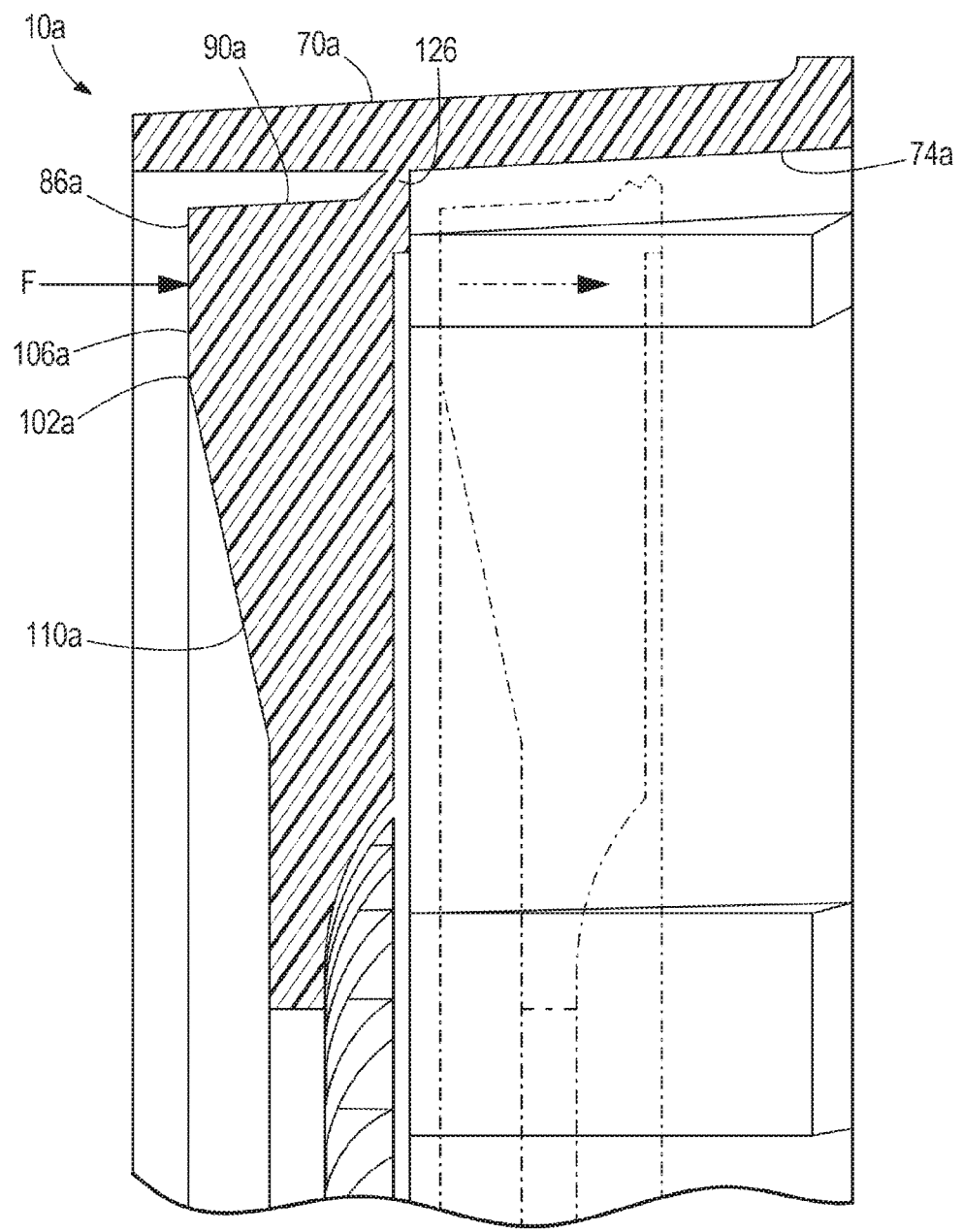
FIG. 10 is a partial section view of the device of FIG. 8 illustrating the operation of a shear feature.

While the embodiment of FIGS. 1-7 illustrates the sleeve 70 and the disc 86 as being separate components, in an alternative embodiment of the device 10*a* shown in FIGS. 8-10, the disc 86*a* is initially integral with the sleeve 70*a* and can be separated from the sleeve 70*a* to permit the sliding of the disc 86*a* along the sleeve inner diameter 74*a* in the axial direction when it is time to install the bearing assembly 14 using the device 10*a*. As illustrated in FIGS. 8-10, the disc 86*a* and the sleeve 70*a* are initially molded from plastic or other materials (similar or dissimilar) as one piece, and one or more shear features 126 (e.g., perforations, a thinned wall portion, one or more stakes, etc.) can be molded between the disc 86*a* and the sleeve 70*a* to facilitate separation of the disc 86*a* from the sleeve 70*a* upon application of a force to the disc 86*a*. In yet another embodiment, the initially separate disc 86 and sleeve 70 could be secured (bonded, adhered, or otherwise secured) together so that an application of axial force is needed to separate the disc 86 from the sleeve 70 to begin axial movement of the disc 86 relative to the sleeve 70. Separation could include breaking of adhesive or bonding, which could be considered shear features, or breaking or deforming of other shear or breakaway features.

Referring to the device 10*a* shown in FIGS. 8-10, like parts have been given like reference numbers to the device 10 with the addition of the suffix "a." The similarities in the like parts and features will not be discussed again, as they were discussed above with respect to the device 10. Only differences between the devices 10 and 10*a* will be described in detail.

For example, the sleeve 70*a* does not include a flange for limiting the movement of the disc 86*a* in one direction. Because the disc 86*a* is initially integral with the sleeve 70*a* (e.g. molded as a single piece with shear features/stakes 126), no flange is required to initially limit movement of the disc 86*a* relative to the sleeve 70*a*. Instead the stakes 126 initially secure the disc 86*a* in position relative to the sleeve 70*a*. As shown, there are eight stakes 126 provided (i.e., integrally molded) on the outer surface 90*a* of the disc 86*a* and/or on the inner surface of the sleeve 70*a*. The stakes 126 are positioned between the ridges Ra so as not to interfere with the axial sliding of the disc 86*a* after the stakes 126 are broken (shown in phantom in FIG. 10) to permit movement of the disc 86*a* within the sleeve 70*a*. As best seen in FIG. 8, the disc 86*a* is staked to the sleeve 70*a* at an axial location spaced from both the first and second ends 76*a*, 78*a* of the sleeve 70*a*. The initial spacing of the disc 86*a* away from the second end 78*a* enables a user to select a pressing tool (e.g., a pipe or tube) with the appropriate outside diameter by making sure that the pressing tool will fit into the opening in the second end 78*a* and within the inner diameter 74*a*.

In this alternative embodiment of the device 10*a*, in which the sleeve 70*a* and the disc 86*a* are initially formed as one piece and therefore connected together, or in other alternatives in which the disc and sleeve are separately formed as two pieces but are initially secured together, applying the axial force F to the disc 86*a* as shown in FIG. 10 breaks the shear feature 126 (e.g., perforations, a thinned wall portion, one or more stakes, adhesive, etc.) initially connecting the disc 86*a* and the sleeve 70*a* to permit the disc 86*a* to move in the piston-like manner relative to the sleeve 70*a*. The remainder of the bearing assembly installation method described above remains the same.

Various features and advantages of the invention are set forth in the following claims.

What is claimed is:

1. A device for supporting and installing a bearing assembly, the bearing assembly including an inner ring having an inner ring axial face, an outer ring having an outer ring axial face and an outer diameter, and a plurality of rolling elements positioned between the inner ring and the outer ring, the device comprising:
    a sleeve having a first end with an opening through which the bearing assembly can be received into or removed from the sleeve, a second end opposite the first end, and an inner diameter sized and configured to receive and support the outer ring along the outer diameter, wherein the inner diameter of the sleeve includes a plurality of spaced-apart ridges extending axially along the sleeve, the ridges collectively defining the inner diameter of the sleeve; and
    a disc positioned within the sleeve, the disc including,
        a disc outer surface defining an outer diameter substantially equal to the inner diameter of the sleeve to permit sliding of the disc outer surface along the sleeve inner diameter in an axial direction of the sleeve, and
        a disc face surface facing the first end and sized and configured to engage the inner ring axial face, or the outer ring axial face, or both when the bearing assembly is received in the sleeve.

2. The device of claim 1, wherein the disc is annular in shape.

3. The device of claim 1, wherein the disc is initially a separate component from the sleeve.

4. The device of claim 3, wherein the sleeve includes a shoulder extending radially inwardly from the inner diameter, the shoulder operable to limit axial movement of the disc in one direction.

5. The device of claim 1, wherein the disc is secured to the sleeve via a shear feature and can be separated from the sleeve to permit the sliding of the disc along the sleeve inner diameter in the axial direction.

6. The device of claim 1, wherein the disc is initially integral with the sleeve and can be separated from the sleeve to permit the sliding of the disc along the sleeve inner diameter in the axial direction.

7. The device of claim 6, wherein the disc and the sleeve are initially molded from plastic as one piece, and wherein a shear feature is molded between the disc and the sleeve to facilitate separation of the disc from the sleeve upon application of a force to the disc.

8. The device of claim 7, wherein the shear feature includes a plurality of stakes positioned about the disc outer diameter.

9. The device of claim 6, wherein the initially integral disc is connected to the sleeve at a location spaced from the first and second ends of the sleeve.

10. The device of claim 1, wherein the sleeve is generally cylindrical in shape with an opening at the second end.

11. The device of claim 1, wherein the bearing assembly further includes a seal between the inner ring and the outer ring, and wherein the disc face surface further engages the seal when the bearing assembly is received in the sleeve.

12. The device of claim 1, wherein both the sleeve and the disc are made from plastic.

13. The device of claim 1, wherein the disc face surface includes recesses.

14. The device of claim 1, wherein the disc further includes a disc pressing surface opposite the disc face surface, the disc pressing surface having a planar portion configured to receive a pressing tool.

15. A device for supporting and installing a bearing assembly, the bearing assembly including an inner ring having an inner ring axial face, an outer ring having an outer ring axial face and an outer diameter, and a plurality of rolling elements positioned between the inner ring and the outer ring, the device comprising:
  a sleeve configured to receive and support the outer ring along the outer diameter, the sleeve including a plurality of spaced-apart ridges extending axially along the sleeve, the ridges collectively defining an inner diameter of the sleeve that engages the outer diameter of the outer ring, and
  a disc positioned within the sleeve, the disc including,
    a disc outer surface defining an outer diameter substantially equal to the inner diameter of the sleeve to permit sliding of the disc outer surface along the sleeve inner diameter in an axial direction of the sleeve, and
    a disc face surface sized and configured to engage the inner ring axial face, or the outer ring axial face, or both when the bearing assembly is received in the sleeve,
  wherein the disc and the sleeve are initially molded from plastic as one piece, and wherein a shear feature is molded between the disc and the sleeve to facilitate separation of the disc from the sleeve upon application of a force to the disc.

16. A device for supporting and installing a bearing assembly, the bearing assembly including an inner ring having an inner ring axial face, an outer ring having an outer ring axial face and an outer diameter, and a plurality of rolling elements positioned between the inner ring and the outer ring, the device comprising:
  a sleeve having a first end with an opening through which the bearing assembly can be received into or removed from the sleeve, a second end opposite the first end, and an inner diameter sized and configured to receive and support the outer ring along the outer diameter; and
  a disc positioned within the sleeve, the disc including,
    a disc outer surface defining an outer diameter substantially equal to the inner diameter of the sleeve to permit sliding of the disc outer surface along the sleeve inner diameter in an axial direction of the sleeve, and
    a disc face surface facing the first end and sized and configured to engage the inner ring axial face, or the outer ring axial face, or both when the bearing assembly is received in the sleeve;
  wherein the inner diameter of the sleeve includes a plurality of spaced-apart ridges extending axially along the sleeve, the ridges collectively defining the inner diameter of the sleeve; and
  wherein the disc further includes a disc pressing surface opposite the disc face surface, the disc pressing surface having a planar portion configured to receive a pressing tool.

17. The device of claim 16, wherein both the sleeve and the disc are made from plastic.

18. The device of claim 16, wherein the disc is annular in shape.

* * * * *